United States Patent
Schulz et al.

(10) Patent No.: US 9,485,217 B2
(45) Date of Patent: Nov. 1, 2016

(54) METHOD FOR CONFIGURING NETWORK NODES OF A TELECOMMUNICATIONS NETWORK, TELECOMMUNICATIONS NETWORK, PROGRAM AND COMPUTER PROGRAM PRODUCT

(71) Applicant: DEUTSCHE TELEKOM AG, Bonn (DE)

(72) Inventors: Mario Schulz, Geithain (DE); Jens Kaluza, Bonn (DE); Juergen Maurer, Bad Neuenahr-Ahrweiler (DE); Frank Lehser, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/418,456

(22) PCT Filed: Jul. 4, 2013

(86) PCT No.: PCT/EP2013/064202
§ 371 (c)(1),
(2) Date: Jan. 30, 2015

(87) PCT Pub. No.: WO2014/019799
PCT Pub. Date: Feb. 6, 2014

(65) Prior Publication Data
US 2015/0229608 A1  Aug. 13, 2015

(30) Foreign Application Priority Data
Aug. 2, 2012 (EP) .................................. 12179003

(51) Int. Cl.
*G06F 9/00* (2006.01)
*H04L 29/06* (2006.01)
*H04L 12/24* (2006.01)
*H04L 12/26* (2006.01)

(52) U.S. Cl.
CPC ....... *H04L 63/0209* (2013.01); *H04L 41/0806* (2013.01); *H04L 63/0263* (2013.01); *H04L 63/0428* (2013.01); *H04L 63/20* (2013.01); *H04L 43/10* (2013.01); *H04L 63/126* (2013.01)

(58) Field of Classification Search
CPC .......................... H04L 63/0428; H04L 63/164
USPC .......................................................... 726/14
See application file for complete search history.

(56) References Cited

U.S. PATENT DOCUMENTS

| 2002/0080784 A1* | 6/2002 | Krumel .................. B82Y 20/00 370/384 |
| 2002/0194497 A1 | 12/2002 | McGuire |
| 2007/0157301 A1* | 7/2007 | Taglienti ............. H04L 63/0254 726/11 |
| 2008/0028457 A1 | 1/2008 | Diaz-Cuellar et al. |

* cited by examiner

*Primary Examiner* — Anthony Brown
(74) *Attorney, Agent, or Firm* — Leydig, Voit & Mayer, Ltd.

(57) ABSTRACT

A method for configuring network nodes of a telecommunications network includes configuring a remote network node of a plurality of remote network nodes based on a first set of configuration parameters; authenticating the remote network node based on an encryption information obtained from an encryption information infrastructure; configuring a firewall entity of a plurality of firewall entities based on a second set of configuration parameters, wherein the configuration of the firewall entity is initiated by the remote network node based on an initial configuration message being sent directly or indirectly from the remote network node to the firewall entity; and authenticating the configuration of the firewall entity based on the encryption information of the remote network node, the encryption information being obtained by the firewall entity directly or indirectly from the remote network node with the initial configuration message.

13 Claims, 2 Drawing Sheets

METHOD FOR CONFIGURING NETWORK NODES OF A TELECOMMUNICATIONS NETWORK, TELECOMMUNICATIONS NETWORK, PROGRAM AND COMPUTER PROGRAM PRODUCT

CROSS-REFERENCE TO RELATED APPLICATIONS

This application is a U.S. National Phase application under 35 U.S.C. §371 of International Application No. PCT/EP2013/064202, filed on Jul. 4, 2013, and claims benefit to European Patent Application No. EP 12179003.4, filed on Aug. 2, 2012. The International Application was published in English on Feb. 6, 2014 as WO 2014/019799 under PCT Article 21(2).

FIELD

The present invention relates to a method for configuring network nodes of a telecommunications network, especially a public land mobile network.

The present invention further relates to a telecommunications network comprising a plurality of remote network nodes, a plurality of firewall entities and a plurality of central network nodes.

BACKGROUND

Currently, telecommunications networks, especially telecommunications networks such as public land mobile networks, are comparably complex. The traffic from a remote site (or typically distributed sites), especially a radio base station, needs to pass several firewalls before reaching the destination, e.g. a central network node of the core network of the public land mobile network such as a network management system (NMS), a public key infrastructure system (PKI-system), or another network entity. All firewalls on the way to the destination need to be well configured, as otherwise the communication is blocked.

Presently, the following principles apply to firewall configurations:

currently, the configuration of the firewall entities is a manual process, especially in heterogeneous environments (different firewall types/suppliers, different responsibilities, etc.), each firewall is to be configured separately (often one after the other), a central configuration system for all firewalls is not possible and/or will need manual adaptation from one firewall supplier to another firewall supplier as well as partly from one firewall software release to another firewall software release.

This means that the configuration efforts to assure that the firewall entities in the telecommunications network remain up to date and in an operational state is somehow detrimental to realising a dynamic configuration and re-configuration as well as an automation in the configuration and re-configuration of Internet Protocol networks.

Presently, the following principles apply to end-systems or remote network nodes such as radio base stations:

network elements, e.g. remote network node such as radio base stations, are using certificates to establish an IPSec-tunnel and gain access to the central sites. To get access to the backbone networks, the network elements, e.g. radio base stations such as eNodeBs, is presenting a certificate to the IPSec-gateway; the IPSec-gateway is checking the certificate and if the result is positive, the remote network element can establish an IPSec-tunnel and access the backbone, the initial certificate is provided to the network element during the plug and play process by a public key infrastructure system, at least partially, it happens that the configuration of firewalls is forgotten or that the configuration of firewalls is applied incorrectly, e.g. by using a wrong interface.

at least partially, the deletion of firewall rules that are no longer needed is forgotten or not covered in the operational and maintenance process, so that the firewall rule set will only increase, but not decrease if some communication relations are not needed anymore.

SUMMARY

In an embodiment, the invention provides a method for configuring network nodes of a telecommunications network. The telecommunications network includes a plurality of remote network nodes, a plurality of firewall entities, and a plurality of central network nodes. The method includes: configuring a remote network node of the plurality of remote network nodes based on a first set of configuration parameters; authenticating the remote network node based on an encryption information obtained from an encryption information infrastructure; configuring a firewall entity of the plurality of firewall entities based on a second set of configuration parameters, wherein the configuration of the firewall entity is initiated by the remote network node based on an initial configuration message being sent directly or indirectly from the remote network node to the firewall entity; and authenticating the configuration of the firewall entity based on the encryption information of the remote network node, the encryption information being obtained by the firewall entity directly or indirectly from the remote network node with the initial configuration message.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention relate to integrating remote network elements such as radio base stations into an existing telecommunications network or configuring network nodes of a telecommunications network such that the telecommunications network provides a comparably high service level (i.e. is operational) and at the same time provides a comparably high degree of security within the telecommunications network.

In an embodiment, the invention provides a method for configuring network nodes of a telecommunications network, wherein the telecommunications network comprises a plurality of remote network nodes, a plurality of firewall entities and a plurality of central network nodes, wherein the effort to configure and to install network elements within the telecommunications network is reduced, the operational functionality of the telecommunications network increased and the effort to configure the network nodes reduced.

In an embodiment, the invention provides a method for configuring network nodes of a telecommunications network, the telecommunications network comprising
a plurality of remote network nodes,
a plurality of firewall entities, and
a plurality of central network nodes,
wherein a remote network node of the plurality of remote network nodes is configured by means of a first set of configuration parameters and authenticated by means of an encryption information obtained from an encryption information infrastructure, wherein a firewall entity of the plurality of firewall entities is configured by means of a second set of configuration parameters,
wherein the configuration of the firewall entity of the plurality of firewall entities is initiated by the remote network node of the plurality of remote network nodes by means of an initial configuration message being sent—directly or indirectly—from the remote network node to the firewall entity, and
wherein the configuration of the firewall entity of the plurality of firewall entities is authenticated by the encryption information of the remote network node, the encryption information being obtained by the firewall entity—directly or indirectly—from the remote network node with the initial configuration message.

It is thereby advantageously possible according to the present invention to use the same certificate or the same preshared key, i.e. the same encryption or authentication information, both for the establishment of the IPSec-tunnel and to automatically configure firewall rules. Typically, a new radio base station, e.g. a new eNodeB, is integrated into the telecommunications network by using a plug and play process. This means that the radio base station or the remote network node is connected to the telecommunications network or plugged into the telecommunications network and afterwards, everything is done by the information stored in the radio base station or in the remote network node. This plug and play process typically includes, as a first step, a scan for the correct VLAN (Virtual Local Area Network) by means of DHCP (Dynamic Host Configuration Protocol) request messages. Furthermore, in a second step, the remote network node, especially the radio base station, will receive a DHCP reply message on a single VLAN. Additionally, this DHCP reply message includes some basic configuration for the radio base station or the remote network node. The basic configuration furthermore allows, during a third step, that the remote network node or the radio base station requests an encryption or authentication certificate at an encryption information infrastructure, typically a public key infrastructure. Alternatively to requesting an encryption or authentication certificate, it is also possible according to the present invention that a preshared key is distributed to the remote network node, i.e. the radio base station. In a fourth step after the plug and play process, the encryption information infrastructure, i.e. especially the public key infrastructure, will authenticate the remote network node, especially the radio base station, by different measures. The measures are, e.g., a check for a serial number of the radio base station which shall be listed on a white list of the encryption information infrastructure and furthermore a factory certificate (installed on the remote network node or the radio base station within the factory, i.e. during the time of manufacture of the radio base station) will preferably be validated. If the checks of the fourth step of the plug and play process are successfully conducted, the encryption information infrastructure system, preferably a public key infrastructure system, will issue an operator certificate for the remote network node or the radio base station. The operator certificate is preferably an encryption certificate to establish an IPSec-tunnel communication between the remote network node and central network nodes. Alternatively, it is possible according to the present invention that a preshared key is distributed to the remote network node and is used to provide an encryption or an authentication of the communication of the remote network node. According to one preferred embodiment of the present invention, the public key infrastructure system or the encryption information infrastructure will also work as an integration engine, managing the rules for the firewall entities within the telecommunications network between the plurality of radio base stations, i.e. the plurality of remote network nodes, and communication endpoints like, e.g., central network nodes or core network entities of the telecommunications network. The encryption information infrastructure, especially the public key infrastructure, will include the information about the firewall rules related to the encryption certificate issued to the remote network node, especially a radio base station. In a sixth step, the remote network node, especially the radio base station, will send an initial configuration message to the endpoints, the initial configuration messages being configured in order to open the needed firewalls for the needed communication. The initial configuration message includes typically the authentication and/or encryption information, i.e. the operator certificate or operator encryption certificate or the preshared key for the authentication at the network elements, i.e. typically the central network nodes and/or the firewall entities and furthermore also comprises the needed firewall rules. In a seventh step, if the initial configuration message is passing a firewall entity, the firewall entity will use the attached encryption information, i.e. the encryption certificate or the preshared key, to authenticate the remote network node, such as a radio base station, and the information associated with the encryption information to configure the firewall entity, i.e. to configure itself.

According to a preferred embodiment of the present invention, the encryption information is either an encryption certificate or a preshared key information, wherein the encryption information infrastructure is preferably a public key infrastructure.

Thereby, it is advantageously possible to either use a preshared key information or an encryption certificate as the encryption information.

According to a further preferred embodiment of the present invention, the second set of configuration parameters is provided by an integration engine, the integration engine being provided at the remote network node of the plurality of remote network nodes, and/or at the encryption information infrastructure and/or at a central network node of the plurality of central network nodes and/or at a configuration server.

Thereby, it is advantageously possible that the integration engine can be located flexibly within the telecommunications network.

It is furthermore preferred according to the present invention that the second set of configuration parameters is generated by the integration engine based on the first set of configuration parameters and a network nodes communication protocol implementation.

Thereby, it is advantageously possible that the second set of configuration parameters are generated automatically and/or dynamically based on the first set of configuration parameters and the network nodes communication protocol implementation, wherein the network nodes communication protocol implementation corresponds especially to the default configuration (e.g. factory settings) of the network node, e.g. the remote network node or the central network node.

According to a further preferred embodiment of the present invention, the encryption information is used both for configuring the firewall entity of the plurality of firewall entities and for establishing a secure communication tunnel between the remote network node of the plurality of the remote network nodes and the plurality of central network nodes.

Thereby, it is advantageously possible to not only integrate a remote network node into the telecommunications network for communication purposes but also to configure firewall entities by means of the encryption information.

According to the present invention, it is furthermore preferred that the encryption information and the second set of configuration parameters is used for configuring at least two firewall entities of the plurality of firewall entities between the remote network node of the plurality of the remote network nodes and the plurality of central network nodes.

Thereby, it is advantageously possible according to the present invention that—in case that more than one firewall entity is used to fulfil a communication need between the remote network node and one of the central network nodes—more than one firewall entity is configured by the encryption information in the second set of configuration parameters.

According to still a further preferred embodiment of the present invention, the remote network node periodically sends a configuration-keep-alive message to inform other network nodes between the remote network node a communication endpoint that the configuration is still valid, wherein the configuration is invalidated in case that a keep-alive message is not received at a firewall entity for a configurable time interval.

Thereby, it is advantageously possible according to the present invention that the configuration of the firewall entities continuously remains up to date which means that unused parts of configuration parameters are erased which increases the overall safety level of the telecommunications network because unused open doors are closed by means of the invalidation of certain configuration information which means that previously open doors are at least closed after a time interval within which a configuration-keep-alive message is expected by a firewall entity and the corresponding (previously) open door is closed in case that no configuration-keep-alive message is received within the time interval.

According to the present invention, it is advantageously possible that the reception of a configuration-keep-alive message is answered by the central network node by means of a configuration-keep-alive acknowledgement message towards the remote network node. For example, it is possible and preferred according to the present invention that the remote network node repeatedly sends a configuration-keep-alive message within a configuration-keep-alive time interval of, e.g., one hour or two hours or three hours or the like. If the remote network node does not receive the configuration-keep-alive acknowledgement message from the corresponding to the relevant network nodes, especially central network nodes, a further operation takes place, e.g. an exception is raised with an error handling system within the telecommunications network.

According to another preferred embodiment (without using a configuration-keep-alive acknowledgment message), the time interval after which the configuration is invalidated in case that a keep-alive message is not received at a firewall entity (hereinafter also called invalidating time interval) is chosen such that the configuration-keep-alive time interval is considerably shorter, e.g. the invalidating time interval corresponds to three times (or four times of five times or ten times or twenty times) the configuration-keep-alive time interval. Thereby, it is advantageously possible according to the present invention that the remote network nodes just send the configuration-keep-alive messages without the necessity for the other network nodes, especially firewall entities, to send the configuration-keep-alive acknowledgement messages.

According to still a further preferred embodiment of the present invention, the central node is triggered by the remote network node to configure the firewall entities, especially by means of acknowledging an initial configuration message from the remote network node, wherein preferably the acknowledging message is authenticated by using the encryption information of the central network node.

Furthermore, the present invention relates to a telecommunications network for configuring network nodes of the telecommunications network, the telecommunications network comprising a plurality of remote network nodes, a plurality of firewall entities, and a plurality of central network nodes, wherein a first set of configuration parameters is provided for a configuration of a remote network node of the plurality of remote network nodes and wherein an encryption information is provided to authenticate the remote network node of the plurality of remote network nodes, the encryption information being obtained from an encryption information infrastructure, wherein the telecommunications network is configured such that a firewall entity of the plurality of firewall entities is configured by means of a second set of configuration parameters, wherein the telecommunications network is configured such that the configuration of the firewall entity of the plurality of firewall entities is initiated by the remote network node of the plurality of remote network nodes by means of an initial configuration message being sent—directly or indirectly—from the remote network node to the firewall entity, and wherein the telecommunications network is configured such that the configuration of the firewall entity of the plurality of firewall entities is authenticated by the encryption information of the remote network node, the encryption information being obtained by the firewall entity—directly or indirectly—from the remote network node with the initial configuration message.

The telecommunications network according to the present invention is advantageously enabled to be configurable in a more convenient manner, i.e. with less effort of time and manual configuration steps. This leads generally to a higher degree of safety within the telecommunications network.

It is furthermore preferred according to the present invention—also with respect to the telecommunications network—that the telecommunications network comprises an integration engine, wherein the integration engine comprises the second set of configuration parameters, the integration engine being provided at the remote network node of the plurality of remote network nodes, and/or at the public key infrastructure, and/or at a central network node of the plurality of central network nodes, and/or at a configuration server.

According to further preferred embodiments of the present invention—also with respect to the telecommunications network—it is preferred that the telecommunications network is configured such that the encryption certificate is used both for configuring the firewall entity of the plurality of firewall entities and for establishing a secure communication tunnel between the remote network node of the plurality of the remote network nodes and the plurality of central network nodes.

It is furthermore preferred according to the present invention that the encryption certificate and the second set of configuration parameters is used for configuring at least two firewall entities of the plurality of firewall entities between the remote network node of the plurality of the remote network nodes and the plurality of central network nodes.

Additionally, the present invention relates to a program comprising a computer readable program code which, when executed on a computer or on an entity of a telecommunications network, causes the computer or the entity of the telecommunications network to perform the inventive method.

Still additionally, the present invention relates to computer program product for using a user equipment, the computer program product comprising a computer program stored on a storage medium, the computer program comprising program code which, when executed on a computer or on an entity of a telecommunications network, causes the computer or the entity of the telecommunications network to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
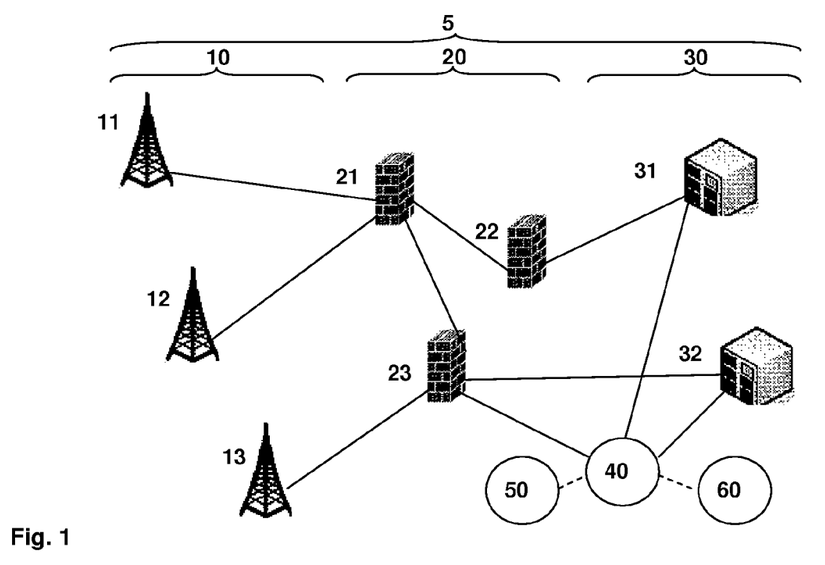
FIG. 1 schematically illustrates a plurality of radio base stations as examples of remote network nodes being integrated in a telecommunications network, the telecommunications network comprising a plurality of firewall entities and a plurality of central network nodes.

In FIG. 1, a plurality of radio base stations 10 as examples of remote network nodes 10 are integrated in a telecommunications network 5, wherein the telecommunications network 5 comprises a plurality of firewall entities 20 and a plurality of central network nodes 30. As examples of the plurality of remote network nodes 10, especially radio base stations 10, a first remote network node 11, a second remote network node 12, and a third remote network node 13 are schematically illustrated. Likewise, as examples of the plurality of firewall entities 20, a first firewall entity 21, a second firewall entity 22, and a third firewall entity 23 are schematically shown as part of the telecommunications network 5. Additionally, as examples of the plurality of central networks nodes 30, a first central network node 31 and a second central network node 32 are schematically shown. Exemplarily, the first remote network node 11 is connected to the first firewall entity 21. Furthermore schematically, the second remote network node 12 is also connected to the first firewall entity 21. Furthermore exemplarily, the third remote network node 13 is connected to the third firewall entity 23. Furthermore exemplarily, the first firewall entity 21 is connected to the second firewall entity 22. Furthermore exemplarily, the first firewall entity 21 is connected to the third firewall entity 23. Furthermore exemplarily, the second firewall entity is connected to the first central network node 31. Furthermore exemplarily, the third firewall entity 23 is connected to the second central network node 23.

Additionally, the telecommunications network 5 comprises an encryption information infrastructure 40 and an integration engine 50. Furthermore, it is preferred according to the present invention that the telecommunications network 5 comprises a configuration server 60.

Figure 2:
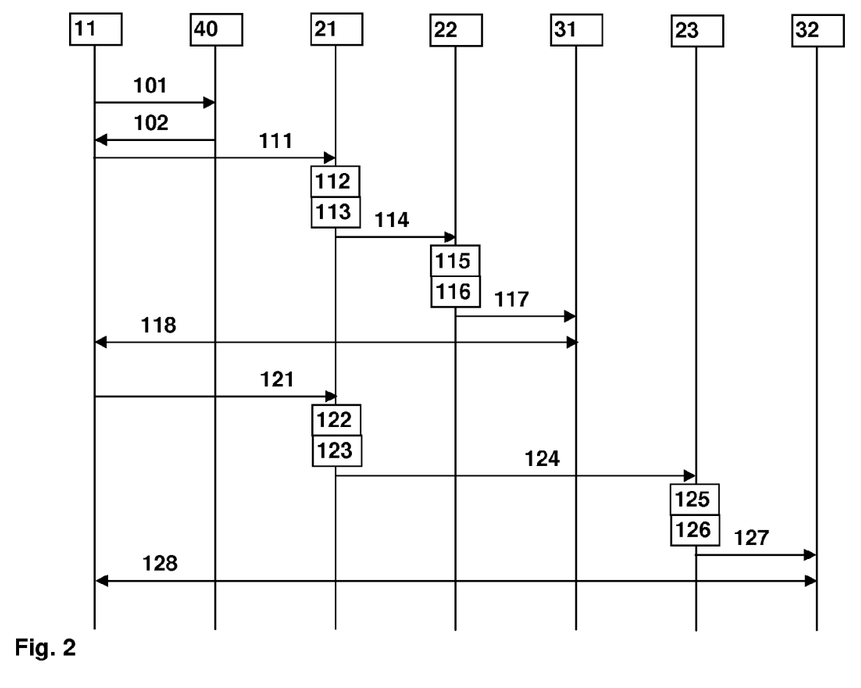
FIG. 2 schematically illustrates a communication diagram of communications between a remote network node, a plurality of firewall entities, and a plurality of central network nodes.

In FIG. 2, a communication diagram of the communication between a remote network node 11, the first, second and third firewall entities 21, 22, 23 and the first and second central nodes 31, 32 is schematically shown. In a first step 101, the first remote network node 11 requests a certificate or an encryption (or authentication) information (which can also be a pre-shared key) from the encryption information infrastructure 40. The encryption information infrastructure, which is preferably a public key infrastructure 40, also prepares firewall rules. In an embodiment of the inventive telecommunications network, the functionality for preparing firewall rules can also be located in a configuration server 60 or in an integration engine 50. In a second step 102, the encryption information infrastructure 40 provides the encryption information including the firewall rules to the first remote network node 11. The first and second step 101, 102 relate to a preliminary step or preparatory step for providing the correct encryption (or authentication) information, especially an encryption certificate or a preshared key, as well as the firewall rules. In a second exemplary group of steps, a communication between the first remote network node 11 and the first central network node 31, especially a network node of the core network of the telecommunications network 5, is to be established. For this purpose, in a third step, a message 111 is sent from the first remote network node 11 to the first firewall entity 21. The message 111 corresponds to a firewall configuration message comprising an indication of the destination, namely the IP address of the first central network node 31, for example belonging to the core network of the telecommunications network 5. In a fourth step 112, the encryption (or authentication) certificate, or more generally, the encryption (or authentication) information, is validated by the first firewall entity 21. In a fifth step 113, the firewall rules of the first firewall entity 21 are configured. In a sixth step 114, a message is sent from the first firewall entity 21 to the second firewall entity 22, this message corresponding to a firewall configuration message also including an indication about the destination of the communication event, namely the first central network node 31. The source address remains the address of the first remote network node 11. In a seventh step 115, the firewall configuration message of the sixth step is validated by the second firewall entity 22 and in an eighth step 116, the respective firewall rules of the second firewall entity 22 are configured. In a ninth step 117, a firewall configuration message is sent from the second firewall entity 22 to the first central network node 31. After the ninth step the communication link between the first remote network node 11 and the first central network node 31 is established and in a tenth step 118 the communication link is established for providing the possibility to transmit traffic information from the first remote network node 11 to the first central node 31. In an analogous manner to the second group of steps of providing a communication link between the first remote network node 11 with the first central network node 31, in a third group of steps, a communication link between the first remote network node 11 and the second central network node 32 is established by means of an eleventh step 121, a twelfth step 122, a thirteenth step 123, a fourteenth step 124, a fifteenth step 125, a sixteenth 126, a seventeenth step 127 and an eighteenth step 128. The eleventh step 121 corresponds to the third step 111. The twelfth step 122 corresponds to the fourth step 112. The thirteenth step 123 corresponds to the fifth step 113. The fourteenth step 124 corresponds to the sixth step 114 with the difference that the firewall configuration message is not sent from the first firewall entity 21 to the second firewall entity 22 but from the first firewall entity 21 to the third firewall entity 23. The fifteenth and sixteenth step 125, 126 correspond to the seventh and eighth step 115, 116 with the difference that the steps are conducted by the third firewall entity 23 and not by the second firewall entity 22. Likewise, the seventeenth step 127 corresponds to the ninth step 117 with the difference that the third firewall entity 23 and the second central network node 32 are concerned. The messages of the third step 111, of the sixth step 114, and of the ninth step 117 are corresponding to each other, i.e. the message content is identical; only a forwarding operation (by the first firewall entity 21 or by the second firewall entity 22, respectively) occurs. Likewise, the messages of the eleventh step 121, of the fourteenth step 124, and of the seventeenth step 127 are corresponding to each other, i.e. the message content is identical; only a forwarding operation (by the first firewall entity 21 or by the third firewall entity 23, respectively) occurs.

The present invention uses authentication information or encryption information—that is needed to get access to the telecommunications network 5—to also authenticate parameter changes for the automatic integration of network nodes, especially remote network nodes, into the telecommunications network 5. If a new node, i.e. a new remote network node, shall be integrated into the telecommunications network 5, this remote network node, e.g. the first remote network node 11, will be configured accordingly and will get authentication information and/or encryption information such as an encryption certificate or a pre-shared key. The remote network node concerned, e.g. the first remote network node 11, shall use this authentication information and/or encryption information to authenticate configuration changes needed to integrate itself into the telecommunications network 5. The remote network node will be able to integrate itself into the telecommunications network so that no manually supported configuration of the remote network node 11 is needed and the configuration of the remaining network will be done automatically. To accomplish such a self-integration, the following components are proposed according to the present invention: an integration engine 50 to generate the configuration parameter needed for the configuration of network nodes. Furthermore an adequate protocol to provide a configuration parameter to the network elements concerned is required. In order to build the needed configuration changes, the integration engine 50 is present. The integration engine generates (automatically or manually) the needed parameter for the nodes or other network equipment of the telecommunications network which are located in between the remote network node (to be newly integrated into the telecommunications network) and the communication endpoints of the remote network node. The integration engine is possible to be located within the telecommunications network, e.g. on the authentication server (e.g. the encryption information infrastructure such as the public key infrastructure, or on the communication endpoints, i.e. central network nodes such as the EMS, entities of the core network or the integration engine could also be realized in the remote network node itself.

In case that the integration engine 50 is located on a separate server within the telecommunications network 5, the remote network node (to be newly configured or integrated into the telecommunications network) needs to receive the configuration parameter for configuring the network entities in between the remote network node and the communication endpoints from the integration engine 50 before the integration of the remote network node can start. On the integration engine 50, i.e. on the separate server, the configuration parameters are managed in order to keep track about the planned changes within the telecommunications network 5. In principle, the integration of the remote network node is done as follows:

in a first part of the integration process, the configuration parameters for the network nodes or network entities of the telecommunications network 5 in between the remote network node and the communication endpoints of the remote network node are preconfigured on the integration engine 50, in a second part of the integration process, the remote network node will contact the integration engine 50, in a third part of the integration process, the integration engine 50 will provide at least one configuration parameter, preferably a plurality of configuration parameters. Examples of such an embodiment of a location of the integration engine 50 within the telecommunications network 5 include that, within radio networks, the integration engine 50 is located on the public key infrastructure system (i.e. on the encryption information infrastructure) or on the configuration server, as the first touch point of a new radio base station during the initiation of the plug and play process.

According to a further embodiment, the integration engine 50 is integrated on at least one of the communication endpoints or on a plurality of the communication endpoints. The parameters for the configuration of the network nodes in between the remote network node and the endpoints are managed by the integration engine located at the endpoint or endpoints. If the integration engine 50 is located on the communication endpoints of the remote network node, the network in between needs to allow an initial communication of the remote network node to the endpoints. If the integration engine is receiving an initial message from a new remote network node, the integration engine 50 will answer with the needed parameter/configuration. To generate the needed configuration, two options are possible:

the configuration parameters for the network entities in between the remote network node and the communication endpoints of the remote network nodes are preconfigured on the integration engine;

the endpoint itself knows which configuration parameters are needed for integrating new remote network nodes into the telecommunications network. So that the integration engine 50 on the endpoints could automatically generate the needed configuration parameter for the network entities in between the remote network node and the communication endpoint of the node. This means that a manual pre-configuration of the integration engine 50 is not needed. For example, within radio networks, an integration engine 50 could be located on the EMS (element management system) as the EMS will already now be preconfigured with the information of a new radio base station, i.e. a new remote network node, it is easy to additionally include the parameters needed for the configuration of the network entities in between the remote network node and the communication endpoints. As the EMS knows which services are needed for the communication between the remote network node and the central network node such as the EMS, the firewall rules, needed to be applied to the firewall (or firewalls) between the remote network node (i.e. for example a radio base station) and the EMS can also be automatically generated by the EMS.

According to a further embodiment, the integration engine 50 could also be located on the remote network node itself. The remote network node already knows its configuration as a prerequisite and its communication endpoints, so that the remote network node itself could automatically generate the configuration parameter needed for the network entities of the telecommunications network in between the remote network node and the communication endpoint. It is also possible according to the present invention to preconfigure the needed parameter with the initial configuration of the remote network node, i.e. with the first set of configuration parameters.

The specific protocol proposed by the present invention to integrate a new remote network node within the telecommunications network 5 is given in the following. After the integration engine 50 has generated the configuration parameter of the new remote network node (hereinafter also called the first set of configuration parameters, intended to configure the remote network nodes), the new remote network node needs to trigger the configuration change within the telecommunications network 5 (i.e. within the network nodes in between the remote network node and the communication endpoints) in order to integrate itself, i.e. the remote network node in the telecommunications network. For this reason, a protocol is preferably used to make the network elements in between the remote network node and the communication endpoints aware of the needed parameter setting or configuration (hereinafter also called the second set of configuration parameters, intended to configure the network entities, especially firewall entities, in between the remote network node and the communication endpoints). Before the remote network node can start a regular communication, i.e. the transmission of traffic, with an endpoint, the remote network node needs to send an initial configuration message to all communication endpoints of the remote network node, especially specifying the source address (i.e. the address of the remote network node) and the destination address (i.e. the address of the communication endpoint). According to a preferred embodiment of the present invention, the following message types are used to realize the automatic integration of remote network nodes into an existing telecommunications network:

an initial configuration message,
an initial configuration message acknowledgement,
an initial configuration message re-acknowledgement,
a configuration update message,
a configuration update message acknowledgement,
a configuration update message re-acknowledgement,
a request configuration message,
a request configuration message acknowledgement,
a request configuration message re-acknowledgement,
a configuration-keep-alive message,
a configuration-keep-alive message acknowledgment,
a configuration-keep-alive message re-acknowledgment.

Figure 3:
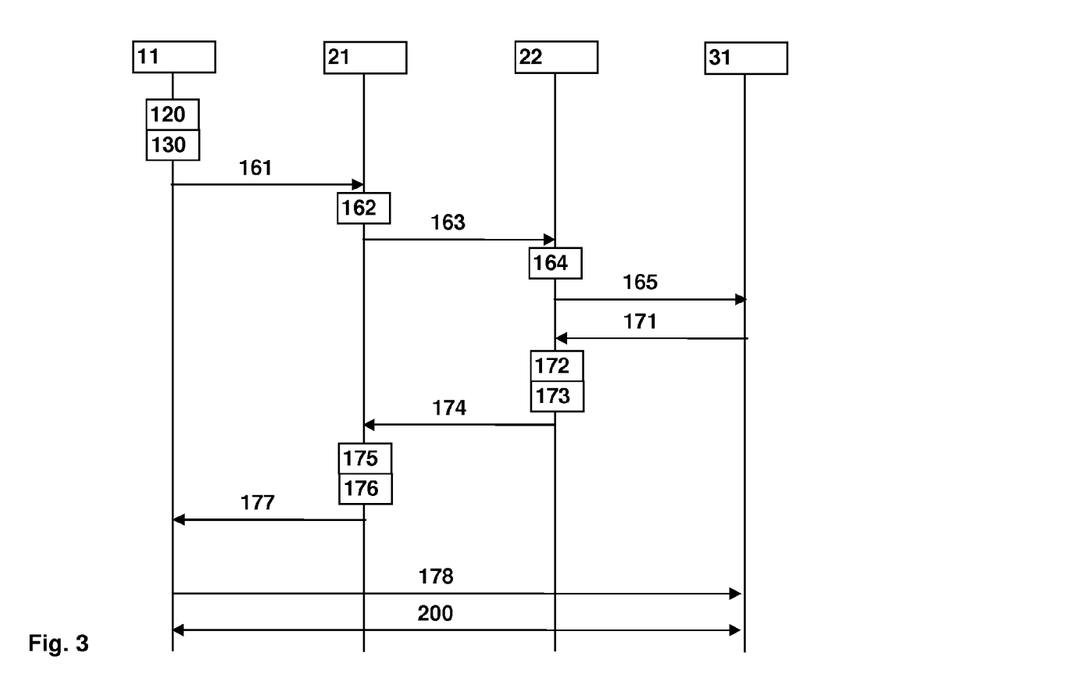
FIGS. 3 and 4 schematically illustrate communication diagrams of communications between the remote network node, a first and a second firewall entity, and a central network node.

The following examples describe the functionality of the exemplary protocol according to the present invention:

The communication endpoint, i.e. one of a plurality of central network nodes 30, is handling the configuration parameters for the remote network node, i.e. the integration engine 50 is located on the endpoints of the communication line. After the remote network node, e.g. the first remote network node 11, has received the authentication information, i.e. the encryption information, and the configuration information (or the first set of configuration parameters), the remote network node is sending an initial configuration message including only the encryption information (or authentication information) to the communication endpoint. This message needs to be allowed to pass the network entities of the telecommunications network by default (corresponding to a general pre-configuration of the network nodes). As soon as the initial configuration message is received by the endpoint, the endpoint generates an acknowledgement message including the authentication information of the endpoint and the network parameter or network configuration for the network entities generated by the integration engine (i.e. the second set of configuration parameters). Every time this acknowledgement message is passing a network element, the information within this acknowledgement message is used to authenticate and configure the network element to integrate the new remote network node. As soon as the remote network node is receiving the acknowledgement message of the communication endpoint, the remote network node will finally reply with a re-acknowledgement message (i.e. an initial configuration message re-acknowledgement) including the parameter/configuration for the network received with the acknowledgement message. Also the re-acknowledgement message will include authentication information. FIG. 3 shows this communication for the scenario that the integration engine 50 is located in the endpoint. FIG. 3 represents the communication between the first remote network node 11, the first firewall entity 21, the second firewall entity 22, and the first central network node 31. In preliminary steps 130, 120, the authentication information is received by the remote network node 11 and the node configuration is done. In a message indicated by reference sign 161, the initial configuration message is sent from the first remote network node 11 to the first firewall entity 21, the initial configuration message being directed to the communication endpoint corresponding to the first central network node 31. In a processing step indicated by means of reference sign 162, the authentication information or encryption information is validated by the first network element which is the first firewall entity 21. Furthermore, a forward the message to the second network element which is in the exemplary embodiment the second firewall entity 22 is generated. This is represented by reference sign 163 comprising the initial configuration message to the communication endpoint (first central network node 31). In a corresponding processing step indicated by reference sign 164, the encryption or authentication information is validated, and the initial configuration message is forwarded to the first central network element 31 represented by reference sign 165. The initial configuration message acknowledgement is sent by the first central network node 31 to the second firewall entity 22, which is indicated by reference sign 171. In the second firewall entity 22, the authentication information is validated and the parameter and configuration information is used to adapt the network element configuration, represented by processing steps 172 and 173. Furthermore the initial configuration message acknowledgement is transmitted to the first firewall entity 21, represented by reference sign 174. In processing steps 175, 176, the authentication information is validated and the parameters and configuration information used to adapt the configuration of the first firewall entity 21. Reference sign 177 represents the forwarding of the initial configuration message acknowledgement to the remote network node 11. Reference sign 178 represents the initial configuration message re-acknowledgement sent by the first remote network node 11 to the communication endpoint, i.e. the first central network node 31. Subsequently, the communication providing the traffic transmission, indicated by reference sign 200, starts.

Figure 4:
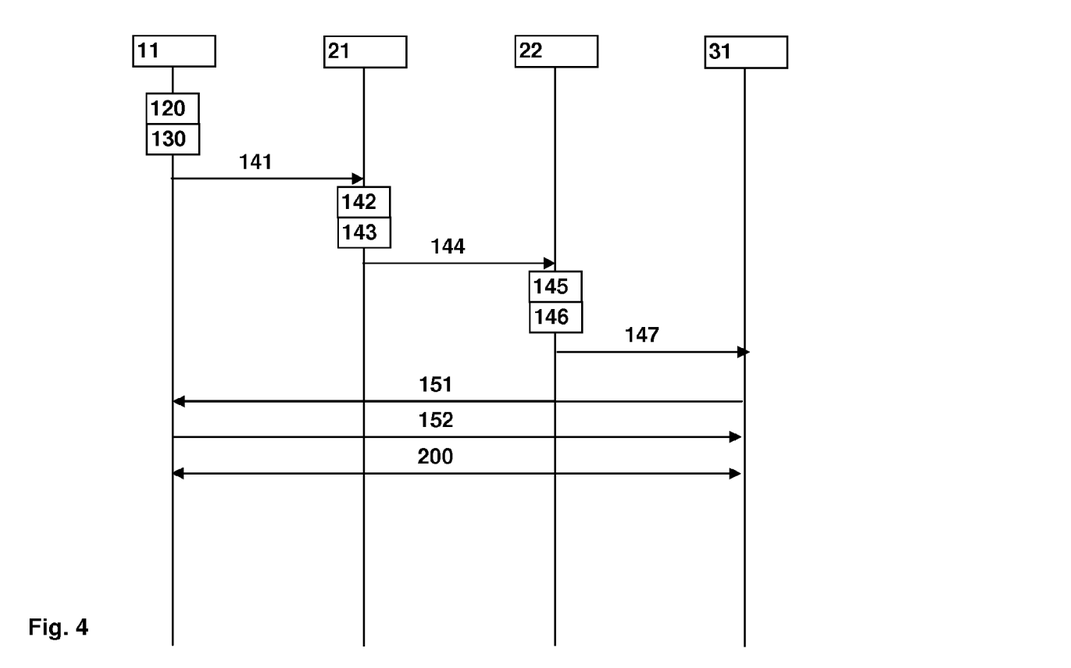

In a further alternative variant of the present invention, the remote network node (e.g. the first remote network node 11) itself is handling the configuration parameter for the network (which means that the integration engine 50 is located on the remote network node 11). The initial configuration message includes an authentication information or an encryption information (i.e. an encryption certificate and/or a signature and/or a pre-shared key) and also includes a configuration parameter for the network elements in between the remote network node and the communication endpoint, e.g. the first central network node 31. Every time the initial configuration message is passing a network element, this network element, is first checking the authentication information (or encryption information) and after the successful authentication check uses the configuration parameter within this initial configuration message to configure itself. After the configuration is available within the network element, the message will be forwarded till the communication endpoint is reached. As soon as the communication endpoint is reached, the initial configuration needs to be acknowledged by the endpoint. The acknowledgement message shall also include the authentication information (or encryption information) and the network parameter and/or configuration. This allows the configuration of the backwards communication line from the communication endpoint to the remote network node, if for the different directions different ways through the telecommunications network are used. To finalize the configuration communication, the remote network node will re-acknowledge the initial configuration message upon receiving the acknowledgement message from the communication endpoint. In FIG. 4, an example of such a message flow is given. In preliminary steps 120, 130, the authentication information is available at the remote network node and the node configuration is done. Furthermore, the parameters/the configuration for the network elements is either present at the remote network node (i.e. the integration engine 50 is located at the remote network node) or the parameters/the configuration for the network elements is received from a separate server hosting the integration engine. In a message indicated by reference sign 141, the initial configuration message is sent from the first remote network node 11 to the first firewall entity 21, the initial configuration message being directed to the communication endpoint corresponding to the first central network node 31. In two processing steps indicated by means of reference signs 142 and 143, the authentication information or encryption information is validated by the first network element which is the first firewall entity 21. Furthermore, the parameters and the configuration information to adapt the first firewall entity 21 configuration are used to accept the initial configuration message and a forwarding message generated to the second network element which is in the exemplary embodiment the second firewall entity 22. This is represented by the reference sign 144 comprising the initial configuration message to the communication endpoint (first central network node 31). In corresponding processing steps indicated by reference signs 145 and 146, the encryption or authentication information is validated and the parameter and the configuration are used to adapt the second firewall entity 22 and the initial configuration message is forwarded to the first central network element 31 represented by reference sign 147. The first central network element 31 then replies by means of an initial configuration message acknowledgement to the remote network node indicated by reference sign 151. This initial configuration message acknowledgement includes the authentication information and the network parameter and configuration. Furthermore, the remote network node 11 replies by an initial configuration message re-acknowledgement to the first central network node 31 which is indicated by reference sign 152. Subsequently, the communication realizing the transmission of traffic information can start indicated by reference sign 200.

The parameter distribution or configuration for newly integrated remote network nodes within the telecommunications network 5, provided by the integration engine needs to be signed and/or encrypted, so that no "man in the middle" is able to change this information. Especially, it is possible to include the configuration parameters (i.e. the second set of configuration parameters) into a certificate which is used to authenticate the remote network node at the telecommunications network 5.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for configuring network nodes of a telecommunications network, the telecommunications network comprising a plurality of remote network nodes, a plurality of firewall entities, and a plurality of central network nodes, the method comprising:
   connecting a remote network node to the telecommunications network;
   configuring the remote network node based on a first set of configuration parameters;
   authenticating, by an encryption information infrastructure, the remote network node based on an encryption information obtained by the remote network node from the encryption information infrastructure;
   sending, by the remote network node, an initial configuration message, directly or indirectly, a firewall entity of the plurality of firewall entities, wherein the initial configuration message includes the encryption information obtained by the remote network node from the encryption information infrastructure;
   authenticating, by the firewall entity, using the encryption information from the initial configuration message, the remote network node; and
   configuring the firewall entity based on a second set of configuration parameters obtained from the initial configuration message from the remote network node.

2. The method according to claim 1, wherein the encryption information is an encryption certificate or a preshared key information.

3. The method according to claim 1, wherein the second set of configuration parameters is provided by an integration engine, the integration engine being provided at the remote network node, and/or at the encryption information infrastructure, and/or at a central network node of the plurality of central network nodes, and/or at a configuration server.

4. The method according to claim 3, wherein the second set of configuration parameters is generated by the integration engine automatically based on the first set of configuration parameters and a network nodes communication protocol implementation.

5. The method according to claim 1, wherein the encryption information is used both for configuring the firewall entity and for establishing a secure communication tunnel between the remote network node and the plurality of central network nodes.

6. The method according to claim 1, wherein the encryption information and the second set of configuration parameters is used for configuring at least two firewall entities of the plurality of firewall entities between the remote network node and the plurality of central network nodes.

7. The method according to claim 1, wherein the remote network node periodically sends a configuration-keep-alive message to inform other network nodes between the remote network node and a communication endpoint that the configuration is still valid, wherein the configuration is invalidated in case that a keep-alive message is not received at a firewall entity for a configurable time interval.

8. The method according to claim 1, wherein the central node is triggered by the remote network node to configure the firewall entities based on acknowledging an initial configuration message from the remote network node.

9. A telecommunications network for configuring network nodes of the telecommunications network, the telecommunications network (5) comprising:
   a plurality of remote network nodes;
   a plurality of firewall entities; and
   a plurality of central network nodes;
   wherein a remote network node is connected to the telecommunications network and is configured based on a first set of configuration parameters;
   wherein the remote network node is configured to be authenticated by an encryption information infrastructure based on an encryption information obtained from the encryption information infrastructure;
   wherein the remote network node is configured to send an initial configuration message, directly or indirectly, to a firewall entity of the plurality of firewall entities, wherein the initial configuration message includes the encryption information obtained by the remote network node from the encryption information infrastructure;
   wherein the firewall entity is configured to authenticate of the remote network node using the encryption information from the initial configuration message; and
   wherein the firewall entity is configured based on a second set of configuration parameters obtained from the initial configuration message.

10. The telecommunications network according to claim 9, wherein the telecommunications network further comprises:
   an integration engine, wherein the integration engine comprises the second set of configuration parameters and is provided at the remote network node, and/or at the encryption information infrastructure, and/or at a central network node of the plurality of central network nodes, and/or at a configuration server.

11. The telecommunications network according to claim 9, wherein the telecommunications network is configured such that the encryption information is used both for configuring the firewall entity and for establishing a secure communication tunnel between the remote network node and the plurality of central network nodes.

12. The telecommunications network according to claim 9, wherein the encryption information and the second set of configuration parameters are used for configuring at least two firewall entities of the plurality of firewall entities between the remote network node and the plurality of central network nodes.

13. One or more non-transitory, computer-readable mediums having processor-executable instructions stored thereon for configuring network nodes of a telecommunications network, the telecommunications network comprising a plurality of remote network nodes, a plurality of firewall entities, and a plurality of central network nodes, the processor-executable instructions, when executed, facilitating performance of the following:

connecting a remote network node to the telecommunications network;

configuring the remote network node based on a first set of configuration parameters;

authenticating, by an encryption information infrastructure, the remote network node based on an encryption information obtained by the remote network node from the encryption information infrastructure;

sending, by the remote network node, an initial configuration message, directly or indirectly, a firewall entity of the plurality of firewall entities, wherein the initial configuration message includes the encryption information obtained by the remote network node from the encryption information infrastructure;

authenticating, by the firewall entity, using the encryption information from the initial configuration message, the remote network node; and configuring the firewall entity based on a second set of configuration parameters obtained from the initial configuration message.

* * * * *